No. 649,018. Patented May 8, 1900.
H. TOLAND & R. A. DUNHAM.
ANIMAL TRAP.
(Application filed July 8, 1899.)
(No Model.)
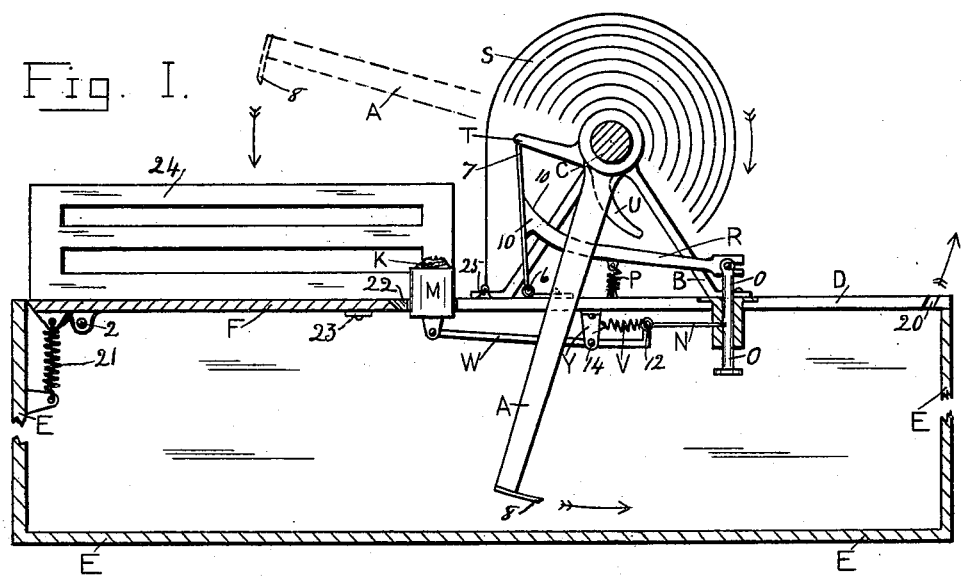
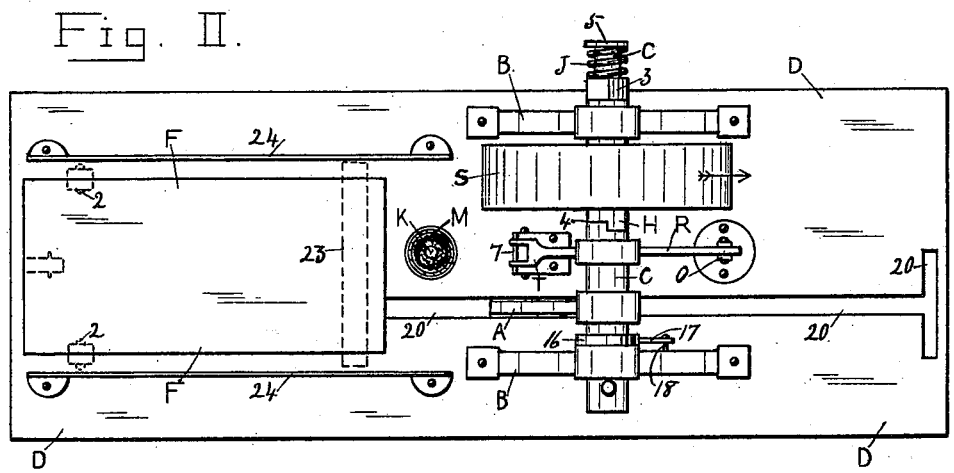
Witnesses.
B. E. Herald
Jas. A. Harvey
Inventors.
Hugh Toland, and
Richard A. Dunham
John K. Hendry
Atty.

UNITED STATES PATENT OFFICE.

HUGH TOLAND AND RICHARD A. DUNHAM, OF JERSEYVILLE, CANADA.

ANIMAL-TRAP.

SPECIFICATION forming part of Letters Patent No. 649,018, dated May 8, 1900.

Application filed July 8, 1899. Serial No. 723,252. (No model.)

*To all whom it may concern:*

Be it known that we, HUGH TOLAND and RICHARD A. DUNHAM, citizens of Canada, residing at Jerseyville, in the county of Wentworth and Province of Ontario, Canada, have invented certain new and useful Improvements in Animal-Traps; and we do hereby declare the following to be a full, clear, and exact description of the invention, such as will enable others skilled in the art to which it appertains to make and use the same.

Our invention relates to an improved animal-trap in which a certain spring lever or arm is connected to a coil-spring at tension and is capable of making a part of a revolution and striking the animal to kill directly the animal nibbles at a certain bait which is connected to said arm by mechanism.

The objects of our invention are, first, to provide a trap which shall be capable of killing a rat or animal immediately the bait is touched, so sensitive is the mechanism connected thereto, and, second, to afford facilities for the killing or trapping successfully of a number of animals consecutively without resetting the trap. We attain these objects by the mechanism illustrated in the accompanying drawings, in which—

Figure 1 is a side elevation of our improved trap, showing particularly the intermittently-revolving arm in position ready for action, the rotary progress of the arm being denoted by arrows, also the arm in its rotary movement in broken lines and in position to strike. Fig. 2 is a plan of Fig. 1, showing the mechanism in position to be operated by means of the coil-spring immediately the bait is touched.

Similar letters and figures refer to similar parts throughout both views.

In the drawings the striking-arm A is rigidly secured to its transverse shaft C and revolves in raised end bearings B, which are mounted on the floor or top D of the trap-box E, which has a trap-door F pivoted at 2 to said floor and which forms a part of the same. This transverse shaft C has a loosely-fitting sleeve H, to which is firmly secured the inner end of the coil-spring S, the outer end of this coil-spring being secured at 25 to the said floor D. The rear or outer end of the aforesaid sleeve H passes through the said raised end bearings B and is squared to admit a wrench to turn said sleeve in order to wind or contract the said coil-spring S to proper tension that the same may be capable of revolving the arm A when released. The way of winding this spring is indicated by arrows. The inner and striking-arm end of this sleeve is formed as a clutch-coupling 4 to enter into the clutch of the shoulder of the shaft C, which conforms to the clutch of the sleeve, to allow the same to revolve to the right and the shaft to the left, as indicated. The sleeve is on a reduced part of the transverse shaft, which extends to the end of the collar 5, the collar acting as a stop for the spiral tension-spring J, which presses against the outer end of said sleeve in order to retain the clutch-coupling of the sleeve in position in and against the clutch-coupling shoulder of the shaft C to facilitate action.

By the power of the coil-spring S the striking-arm A is allowed to revolve with its shaft by means of the coöperation of the mechanism connected therewith, as follows: When the sensitive bait-holder M, which is located in the floor D of the box, is ever so slightly pressed down, the end of the lever W, to which the lower end of the said bait-holder M is pivotally connected, is also thereby pressed downward, and by the fact of this lever W being pivoted at 14 to the rigid bracket Y the bolt N, which is pivotally connected to the opposite end of said lever W, is withdrawn from a slight notch in the vertical rod O. At this time the rod O is released and immediately rises upward by the pressure of the spiral spring P against the lever R, which is hinged at 6, therefore releasing the lever or arm T from the upper extended end 7 of said hinged lever R, and in consequence of the releasing of this lever T, which is secured to the transverse shaft C, the said shaft and the striking-arm, with its transverse end blade 8, is revolved with great rapidity by the power of the coil-spring S. Directly this revolution is accomplished the mechanism of the trap automatically resumes its previous and set position. The end of the said lever T is radially end-slotted or notched out in order that the same may escape contact with the hinged lever R. This resetting of the trap is accomplished by means of the curved end of the revolved arm U engaging with the upper concaved edge 10 of the hinged lever R, consequently lowering the same and also the aforesaid vertical rod O by means of its slight spiral spring V. This arm U is rigidly secured to the aforesaid shaft C. The small ratchet-wheel 16, secured on the aforesaid shaft C, has only a few teeth adjoining each other on its otherwise smooth periphery and is positioned to allow the dog 17 to operate in set teeth to prevent the possibility of said shaft, with its striking-arm, from turning in an opposite direction to that intended or the rebounding of said arm after striking a blow, and thereby facilitating the entrance of the bolt N into the notch of the rod O. This dog 17 is pivoted at 18 to the inner side of the leg of the front bearing B. 20 is an opening in the floor D of the trap-box to allow the striking-arm A, with its transverse end blade 8, to operate. The spiral spring 21 is attached to the pivoted end of the trap-door in order to close the same to position to line 22 after the striking-arm has operated on the animal and driven the same through the opening of the trap-door and into the lever-box. The transverse top 23 on the under side of said trap-door and near to its opening end engages with the under side of the floor D of the trap to prevent the trap-door from rising too high.

Secured to and on the floor D and at each side of the trap-door are the elevated slatted guides 24, forming an entrance for the animal to the bait K in its holder M, which is located in as close proximity as possible to the opening end of the trap-door. The animal is then struck on the back by the blade of the striking-arm and thrust, with the trap-door, through the opening into the box below, which must be of sufficient depth to hold a number of trapped animals in such a manner as not to impede the operation of the striking-arm.

The coil-spring S is of such a nature, size, and strength as to be capable of performing its function of revolving the striking-arm a number of times, and each said time the trap is automatically set for an animal. Hence a number of animals may be caught consecutively, as set forth.

Various changes might be made in the form, size, proportions, and minor details without departure from the spirit and scope thereof.

Hence what we claim as our invention, and desire to secure by Letters Patent, is—

1. An animal-trap of the character described, comprising a striking-arm, having an end transverse blade, secured to a transverse shaft mounted in bearings above the floor of the trap, the inner end of a coil-spring secured to a sleeve on a reduced part of said shaft, the outer end of said spring secured to floor thereof, the sleeve having an inner end clutch to engage a clutch in the shoulder of the reduced part of the shaft to revolve the same, a pivoted spring trap-door below said arm, a bait-holder near to the opening end of the trap-door, and mechanism pivotally connected to the lower part of said bait-holder and which coöperates with a lever, or arm, secured to the said shaft, said lever, or arm, having an end notch to escape the hinged lever, while revolving, substantially as set forth.

2. An animal-trap of the character described comprising a striking-arm having an end transverse blade, said arm secured to a transverse shaft provided with a curved arm, and mounted in bearings on the floor of a box or trap, said arm capable of making one revolution by means of a coil-spring secured at the inner end to a sleeve on a reduced part of said shaft and at the outer end, to the trap-floor, the end of said sleeve capable of revolving said shaft one way by the engagement of a clutch on the end of the spring with the clutch in the shoulder of the shaft formed by said reduced part, a pivoted spring trap-door in said floor positioned as set forth, to receive the said striking-arm, a bait-holder located in the floor at the opening end of the trap-door, and at one side of the striking-arm, and mechanism pivotally connected to the bait-holder and which coöperates with a lever, or arm, secured to said shaft, to revolve the striking-arm once, stop it, and reset the trap, as described.

In testimony whereof we affix our signatures in presence of two witnesses.

HUGH TOLAND.
RICHARD A. DUNHAM.

Witnesses:
JOHN G. COCHRANE,
CAROLINE COCHRANE.